July 9, 1940. E. A. BATCHELDER 2,207,651
CLEANING TOOL
Filed Aug. 25, 1938
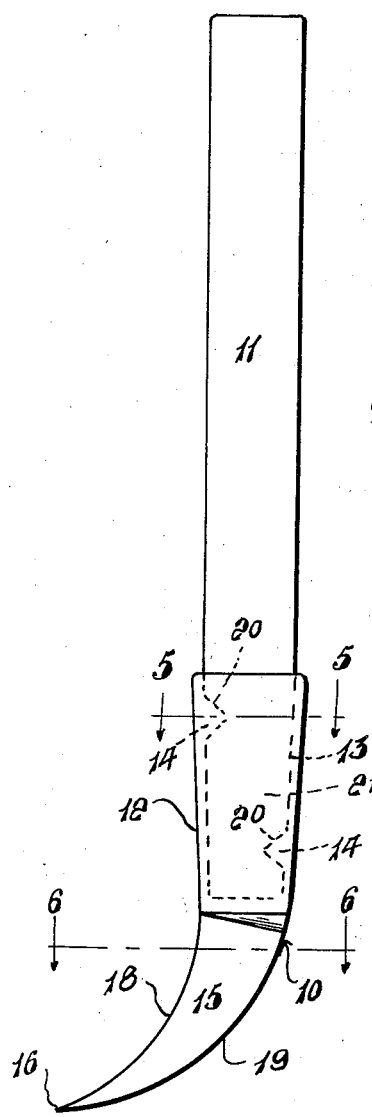
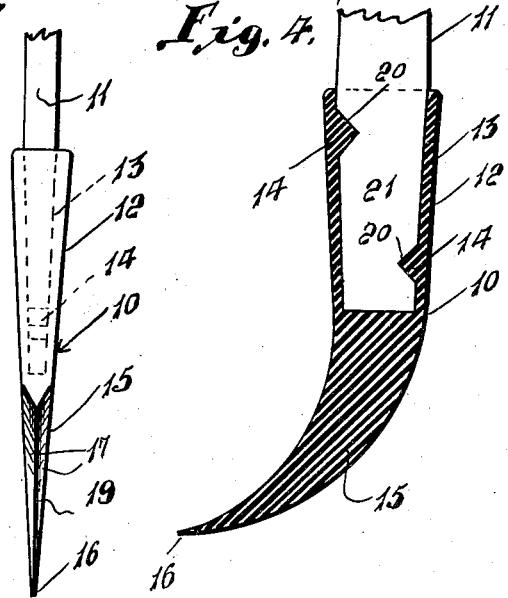
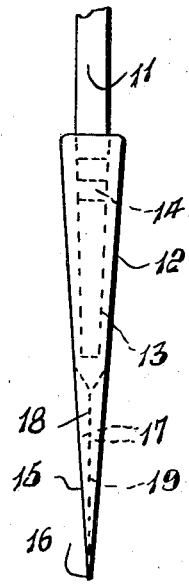
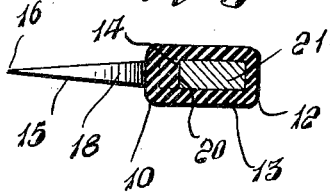
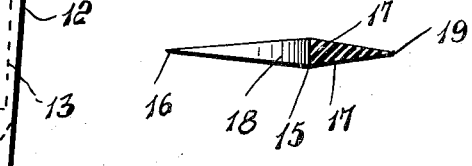
Inventor
E. A. Batchelder
By L. F. Randolph
Attorney Patented July 9, 1940

2,207,651

UNITED STATES PATENT OFFICE 2,207,651

CLEANING TOOL

Edwin A. Batchelder, Lake Geneva, Wis.

Application August 25, 1938, Serial No. 226,798

2 Claims. (Cl. 15—245)

This invention relates to an improved utensil or tool adapted to be used for scraping and cleaning egg beaters and mixers, bottles, plungers of soda fountain syrup dispensers and the like.

It is one aim of this invention to provide a cleaning utensil or tool having a head portion formed of a resilient material such as rubber, or a composition thereof, provided with a curved, sharpened blade portion adapted for use in scraping the article to be cleaned and a pointed and sharpened free end for entering small openings and crevices to clean otherwise inaccessible parts of kitchen utensils and the like.

Still a further object of the invention, is to provide a tool of the class described having improved means for releasably securing a rigid handle in a flexible head.

A further object of the invention is to provide a tool having a cleaning blade that is beveled, curved and tapered to form a feathered-edge, a sharpened point and two oppositely curved edges adapted to be used at a plurality of angles for engaging and scraping otherwise inaccessible parts of articles to be cleaned.

A particular advantage of the invention resides in the fact that it is especially adapted for cleaning all types of beaters and mixers and very efficient in removing the maximum of the accumulation thereon so that the accumulation removed thereby will not be wasted.

Other objects and advantages of the invention will hereinafter become more fully apparent from the following description of the drawing, which illustrates a preferred embodiment thereof, and wherein:

Figure 1 is a side elevational view of the tool,

Figure 2 is a fragmentary elevational view of the rear edge thereof,

Figure 3 is a view similar to Figure 2 of the front edge of the tool,

Figure 4 is a fragmentary longitudinal vertical central sectional view of the tool head showing a portion of the handle, in elevation, releasably held therein, and Figures 5 and 6 are cross sectional views taken on the lines 5—5 and 6—6, respectively, of Figure 1.

Referring more particularly to the drawing, wherein like reference characters designate like or corresponding parts throughout the different views, 10 designates generally the tool head which is preferably formed of rubber, or a composition thereof, and 11 designates the handle portion which is formed of any suitable rigid material.

Head 10 includes the shank portion 12 at the upper end thereof which is provided with a longitudinally disposed recess 13 opening outwardly of its free end and which is provided with the tapering prongs 14 formed integral with the shank 12 and projecting into the opposite sides of the recess 13 adjacent its opposite ends for a purpose which will hereinafter be described.

The head 10 also includes the blade 15 formed integral with the shank 12 and extending from the lower end thereof, said blade being arcuately shaped, as best seen in Figures 1 and 4 and tapering to a point 16 at its free end. Blade 15, as seen in Figure 6, is triangular in cross section being beveled on its opposite sides 17 from its upper or inner edge 18 to form on its under or outer edge 19 a feathered-edge as best seen in Figures 5 and 6, the upper edge 18 of the blade 15 tapers from its upper end to its lower end where it terminates in the point 16 and where its meets the feathered edge 19.

As best seen in Figures 1 and 4, the handle 11 adjacent one end is provided with the notches 20 in its opposite edges which are adapted to receive the prongs 14 when the end 21 is positioned in the recess 13 to releasably retain the handle in engagement with the tool head 10. The prongs 14 being formed of the same material as the head 10 will compress to admit the end 21 which when it reaches its fully inserted position will be disposed with its notches 20 in alinement with the prongs 14 to permit them to expand into said notches to prevent accidental disengagement of the parts 10 and 11.

It will be seen from the drawing and from the description thereof that the blade 15 is well adapted for cleaning all types of domestic beaters and mixers, the plungers of soda fountain dispensing apparatuses as well as the necks and shoulders of bottles by using the feathered-edge 19 or the edge 18 as a scraper and the point 16 as a pick to reach inaccessible places of the aforementioned articles the cleaning of which is generally limited to washing. It will thus be seen that for instance in cleaning a mixer that has been used in mixing batter a substantial portion of the batter that has accumulated on the mixing blades and stem can be removed by the blade 15 and saved which would otherwise have been lost in washing the stem and blades of the mixer.

It is to be understood that the drawing and description are only intended to illustrate a preferred embodiment of the invention and that various modifications and changes may obviously be resorted to and are contemplated, and the right is therefore expressly reserved to make such modifications as fall within the spirit and scope of the invention as hereinafter defined by the appended claims.

I claim as my invention:

1. In a device of the class described, an elongated tapering tool head, a shank, at the enlarged end thereof, having a longitudinally disposed recess formed therein and opening outwardly of its free end to receive a handle, the opposite restricted end of the tool head forming a blade, said blade being arcuately shaped and tapering to a point at its free end, and said blade being beveled on its opposite sides from its inner to its outer edge.

2. A cleaning tool comprising a rigid handle, an elongated, longitudinally tapered, flexible tool head including a shank portion, at the enlarged end thereof, provided with a recess to receive one end of said handle, the opposite restricted end of said head being curved and tapering to a point at its free end and said opposite end being beveled on its opposite sides from its inner to its outer edge to form a sharpened outer edge.

EDWIN A. BATCHELDER.